(12) United States Patent
Kaiser et al.

(10) Patent No.: US 11,598,251 B2
(45) Date of Patent: Mar. 7, 2023

(54) TURBINE WASTEGATE HAVING A FLUIDIC SEALING ARRANGEMENT AND A METHOD OF TESTING THEREOF

(71) Applicant: Cummins Ltd, London (GB)

(72) Inventors: Ivan Kaiser, Huddersfield (GB); James Alexander McEwen, Huddersfield (GB)

(73) Assignee: CUMMINS LTD, London (GB)

( * ) Notice: Subject to any disclaimer, the term of this patent is extended or adjusted under 35 U.S.C. 154(b) by 20 days.

(21) Appl. No.: 17/284,453

(22) PCT Filed: Oct. 11, 2019

(86) PCT No.: PCT/GB2019/052897
§ 371 (c)(1),
(2) Date: Apr. 10, 2021

(87) PCT Pub. No.: WO2020/074917
PCT Pub. Date: Apr. 16, 2020

(65) Prior Publication Data
US 2021/0355863 A1    Nov. 18, 2021

(30) Foreign Application Priority Data
Oct. 12, 2019  (GB) ...................................... 1816680

(51) Int. Cl.
*F02B 37/18*       (2006.01)
*F01D 11/02*      (2006.01)
(Continued)

(52) U.S. Cl.
CPC ............ *F02B 37/183* (2013.01); *F01D 11/02* (2013.01); *F02C 6/12* (2013.01); *F02C 7/28* (2013.01);
(Continued)

(58) Field of Classification Search
CPC ...... F02B 37/183; F02B 37/186; F01D 11/02; F01D 11/04; F01D 17/105; F02C 6/12;
(Continued)

(56) References Cited

U.S. PATENT DOCUMENTS 4,690,572 A *  9/1987  Sasaki ................. F16C 32/0614
                                                          384/399
9,435,714 B2    9/2016  Fontvieille et al.
(Continued)

FOREIGN PATENT DOCUMENTS

GB       2401652 A  *  11/2004  .............. F02B 37/18
GB       2401652 A     11/2004
(Continued)

OTHER PUBLICATIONS

International Search Report and Written Opinion issued by the European Patent Office, dated Dec. 4, 2019, for International Application PCT/GB2019/052897; 10 pages.

*Primary Examiner* — J. Todd Newton
(74) *Attorney, Agent, or Firm* — Faegre Drinker Biddle & Reath LLP

(57) ABSTRACT

A turbine comprising: a turbine housing, a wastegate passage connecting the turbine inlet and the turbine outlet; and a wastegate valve comprising a movable valve member. The wastegate valve has an open state in which a first gas may pass between a turbine inlet a turbine outlet via the wastegate passage and a closed state in which the valve member substantially prevents said first gas from passing between the turbine inlet and the turbine outlet. The valve member is mounted to an actuation member that passes through a bore of the turbine housing. The actuation member is movable to move the wastegate valve between the open and closed states. The turbine comprises a fluid conduit configured to deliver a second gas to the bore to form a fluidic seal (Continued)

between the bore and the actuation member to substantially prevent the passage of said first gas along the bore.

19 Claims, 7 Drawing Sheets

(51) Int. Cl.
*F02C 6/12* (2006.01)
*F02C 7/28* (2006.01)
*F16J 15/34* (2006.01)
*G01M 3/26* (2006.01)

(52) U.S. Cl.
CPC ............... *F16J 15/34* (2013.01); *G01M 3/26* (2013.01); *F05D 2220/40* (2013.01); *F05D 2240/55* (2013.01)

(58) Field of Classification Search
CPC .. F02C 7/28; F16J 15/34; G01M 3/26; G01M 3/3254; G01M 15/14
USPC .......................................................... 415/145
See application file for complete search history.

(56) References Cited

U.S. PATENT DOCUMENTS

| | | | |
|---|---|---|---|
| 9,683,483 B1* | 6/2017 | Bidner | F02B 37/186 |
| 2013/0089411 A1* | 4/2013 | Ward | F02B 39/00 |
| | | | 415/151 |
| 2014/0003908 A1* | 1/2014 | House | F02C 6/12 |
| | | | 415/111 |
| 2017/0074115 A1* | 3/2017 | Isono | F01D 25/04 |
| 2017/0089256 A1* | 3/2017 | Isono | F01D 25/16 |
| 2017/0328247 A1* | 11/2017 | Calkin | F02B 37/18 |

FOREIGN PATENT DOCUMENTS

| | | | | |
|---|---|---|---|---|
| GB | 2516767 A | 2/2015 | | |
| WO | 2010135102 A2 | 11/2010 | | |
| WO | WO-2010135102 A2 * | 11/2010 | ........... | F01D 17/105 |

* cited by examiner

TURBINE WASTEGATE HAVING A FLUIDIC SEALING ARRANGEMENT AND A METHOD OF TESTING THEREOF

CROSS-REFERENCE TO RELATED APPLICATIONS

This application is a national phase filing of International Application No. PCT/GB2019/052897, filed Oct. 11, 2019, which claims the benefit of United Kingdom Application No. 1816680.1, filed on Oct. 12, 2018, the complete disclosures of which being expressly incorporated herein by reference.

FIELD OF THE DISCLOSURE

The present disclosure relates to a turbine, and in particular to a turbine comprising a wastegate having a fluidic sealing arrangement. The present disclosure may form part of a turbocharger or power turbine. The disclosure also relates to a method of preventing leakage from a turbine and a method of testing for leaks within a turbine.

BACKGROUND

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of the rotor to do useful work, for example, generating electrical power; and a turbocharger, which uses the rotational energy of the rotor to compress a fluid.

Turbochargers are well known devices for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold. The turbocharger shaft is conventionally supported by journal and thrust bearings, including appropriate lubricating systems, located within a central bearing housing connected between the turbine and compressor wheel housings.

The turbine of a conventional turbocharger comprises: a turbine chamber within which the turbine wheel is mounted; an annular inlet defined between facing radial walls arranged around the turbine chamber; an inlet volute arranged around the annular inlet; and an outlet passageway extending from the turbine chamber. The passageways and chamber communicate such that pressurised exhaust gas admitted to the inlet volute flows through the inlet to the outlet passageway via the turbine and rotates the turbine wheel. It is also known to improve turbine performance by providing vanes, referred to as nozzle vanes, in the inlet so as to deflect gas flowing through the inlet. That is, gas flowing through the annular inlet flows through inlet passages (defined between adjacent vanes) which induce swirl in the gas flow, turning the flow direction towards the direction of rotation of the turbine wheel.

It is known to provide a turbocharger turbine with a valve controlled bypass port referred to as a wastegate, to enable control of the turbocharger boost pressure and/or shaft speed. A wastegate valve (typically a flap type valve) is controlled to open the wastegate port (bypass port) when the boost pressure of the fluid in the compressor outlet increases towards a pre-determined level, thus allowing at least some of the exhaust gas to bypass the turbine wheel. Typically the wastegate port opens into a wastegate passage which diverts the bypass gas flow to the turbine outlet, thereby bypassing the turbine wheel. The exhaust gas is then passed through an aftertreatment system to remove environmentally harmful emissions such as NOx. Such aftertreatment systems may comprise, for example, a particulate filter and a catalytic converter.

The wastegate valve may be actuated by a variety of means, including electric actuators, but is more typically actuated by a pneumatic actuator operated by boost pressure delivered by the compressor wheel. The wastegate valve actuator is typically connected to the wastegate valve by a linkage, part of which passes through a bore of the turbine housing. Where the linkage passes through the bore it is possible that fluid from the turbine outlet may leak into the gap between the linkage and the bore and then to the atmosphere.

The turbine may form part of an internal combustion engine system. In order to ensure that newly manufactured engines meet minimum performance requirements, such engines typically undergo a pass-off test before being shipped to a customer. One portion of the pass-off test is a leakage test, in which the engine is pressurised and the leak rate out of the engine is measured by a flowmeter. Leakage through the wastegate arrangement is known to contribute to the overall leak rate of the engine. To prevent leakage through the wastegate arrangement, it is known to provide a turbine with a wastegate arrangement having a mechanical contact seal. However, such mechanical contact seals are prone to wear during use, and therefore often degrade over time and require replacement.

A turbine may fail the leakage portion of the pass-off test due to the presence of a leakage path through the wastegate arrangement, for example via the gap between the actuation linkage and the bore. However, the presence of a leakage path through the wastegate arrangement is not, generally, a significant fault which will result in unacceptable performance of the turbine. Turbines which fail the leakage portion of the pass-off test may be recalled so that they can be inspected and/or remanufactured before being retested. It will be appreciated that inspection, remanufacture and/or retesting of a turbine which fails the leakage portion of the pass-off test due to a leakage path via the wastegate assembly (generally, a non-significant fault) may be a waste of time, effort and money. This is because a turbine with a leakage path via the wastegate assembly will, in general, still exhibit acceptable performance.

In some instances, seals are provided that will not degrade during testing of the newly manufactured turbine, but which are deliberately designed to degrade during normal operating conditions (e.g. when the turbine is connected to an engine and operated).

SUMMARY

It is an object of the present disclosure to provide a turbine which obviates or mitigates at the above described disadvantage or disadvantages present in the prior art.

According to a first aspect of the disclosure there is provided a turbine comprising:

a turbine housing defining a turbine inlet upstream of a turbine wheel and a turbine outlet downstream of the turbine wheel;

a wastegate passage connecting the turbine inlet and the turbine outlet;

a wastegate valve comprising a movable valve member;

the wastegate valve having an open state in which a first gas may pass between the turbine inlet and turbine outlet via the wastegate passage and a closed state in which the valve member substantially prevents said first gas from passing between the turbine inlet and the turbine outlet via the wastegate passage;

wherein the valve member is mounted to an actuation member, the actuation member passing through a bore of the turbine housing and being movable so as to move the wastegate valve between the open and closed states; and wherein the turbine comprises a fluid conduit configured to deliver a second gas to the bore so as to form a fluidic seal between the bore and the actuation member so as to substantially prevent the passage of said first gas along the bore.

It will be appreciated that by the term "fluidic seal" it is meant a barrier formed by the presence of fluid. The fluidic seal may act to substantially restrict or hinder the passage of the first gas along the bore. In particular, the fluidic seal may act to substantially prevent, restrict or hinder the passage of the first gas from an interior of the turbine to an exterior of the turbine along the bore. Such fluidic seals work because the energy density of the fluid forming the seal (i.e. the pressure of the second gas) is great enough to counteract the energy density of the fluid in the surrounding environment (i.e. the pressure of the first gas). In particular, the energy density of the fluidic seal may be greater than or equal to the energy density of the fluid in the surrounding environment. As such, the fluid in the surrounding environment does not store enough energy to overcome the fluidic seal, and therefore fluid flow between environments on opposite sides of the fluidic seal is substantially prevented and/or restricted. The second gas may be energised to increase its energy density. In this context, it will be appreciated that an "energised" gas has an energy density greater than or equal to that of its surroundings. It will be appreciated that the first gas may be an exhaust gas emitted from an internal combustion engine.

One of the ways in which the energy density of a fluid can be observed is its pressure. As such, the fluid forming the fluidic seal may be pressurised so that it has an equal or higher pressure than the surrounding environment. The pressure of the surrounding environment will be insufficient to overcome the pressure of the fluid forming the fluidic seal, and therefore fluid flow between environments on opposite sides of the fluidic seal is substantially prevented. Another way in which the energy density of a fluid can be observed is its velocity, and this velocity can be expressed in terms of its equivalent pressure (i.e. "velocity head") using the Bernoulli principle. The fluid forming the fluidic seal may have a velocity head which is equal to or greater than the pressure (i.e. "pressure head") of the surrounding environment, thus preventing fluid flow between environments on opposite sides of the fluidic seal. It will be appreciated that the Bernoulli principle can be used to express different components of the energy of a fluid as an equivalent head of pressure. As such, in general all that is required for the fluidic seal to work is that the total head of the fluid forming the fluidic seal is greater than or equal to the total head of the fluid in the surrounding environment.

It will be appreciated that the fluidic seal may not be a perfect seal, and that a small amount of the first gas may be permitted to travel along the bore without affecting the performance of the seal. For example, during use if any of the first gas is able to travel from an interior of the turbine to an exterior of the turbine along the bore, the amount of the first gas which is able to do so will be relatively small compared to the amount of the first gas which is prevented from doing so by the presence of the fluidic seal.

It will be appreciated that in alternative embodiments, the first and/or second gasses may be any kind of fluid, for example a liquid or a liquid-gas mixture.

It will be appreciated that seals which utilise mechanical barriers rather than fluidic barriers are not envisaged within the meaning of the term "fluidic seal". That is to say, it is the presence of the fluid itself which creates a sealing barrier, and not only the presence of any additional sealing elements. A fluidic seal is therefore a seal which does not comprise elements such as o-rings, piston-rings or other solid barriers. It will be appreciated that in some embodiments the turbine may comprise additional sealing elements such as those described above which act to supplement the sealing provided by the fluidic seal.

It will be appreciated that during the pass-off test, the presence of the fluidic seal acts to prevent any leakage from the interior of the turbine to the exterior of the turbine via the bore. However, as discussed above, leakage from the interior of the turbine via the bore during use is not generally considered to be a significant fault which would cause unacceptable performance of the turbine. As such, so long as the fluidic seal is at least provided during the pass-off test, otherwise acceptable turbines are prevented from failing the leakage portion of the pass-off test and therefore being rejected. Furthermore, the fluidic seal provides the advantage that the number of components required to provide sufficient sealing during the pass-off test is reduced, for example in comparison with temporary or degradable sealing arrangements. Instead, the fluid conduit of the turbine can simply be connected to an energised air supply, such as for example the same compressed air supply as is used to conduct the pass-off test. The provision of such a fluidic seal therefore saves time and money during manufacture, assembly and testing of the turbine.

The above notwithstanding, in certain applications the fluidic seal may be provided throughout the entire life of the turbine, and not just for the duration of the pass-off test. It will be appreciated that such turbines are able to provide adequate sealing without the provision of mechanical components which are prone to wear and which need periodic replacement.

Where the turbine is installed within a vehicle, it will be appreciated that the fluid contained within the interior of the turbine may be an exhaust gas of an internal combustion engine. In such embodiments, the outlet of the turbine may be configured to channel engine exhaust gases through an exhaust gas aftertreatment system of the vehicle to remove harmful substances from the exhaust gases. As such, the turbine of the present disclosure prevents exhaust gases from the engine escaping to the atmosphere before the exhaust gases have been processed by the aftertreatment system.

It will be understood that the interior of the turbine is any portion of the turbine which carries fluid that passes through the turbine wheel or the wastegate passage. That is to say, the interior of the turbine does not include the fluid within the bore or the fluid conduit. However, it will be appreciated that the turbine housing may at least partially define both the bore and fluid conduit even though they are not considered to be part of the interior of the turbine.

The fluid delivered to the bore via the fluid conduit may form a fluid barrier that prevents movement of fluid from the interior of the turbine to an exterior of the turbine via the bore. It will be understood that the term "fluid barrier" is intended to mean that the presence of the fluid delivered to the bore via the fluid conduit substantially impedes or prevents movement of fluid from within the interior of the turbine to the exterior of the turbine. That is to say, there may exist two separate streams of fluid: (i) a first stream of fluid passing through the turbine wheel and/or the wastegate passage within the interior of the turbine, and (ii) a second stream of fluid delivered to the bore via the fluid conduit. The fluid barrier may be formed by the presence of the second stream of fluid within the bore which acts to prevent movement of the first stream of fluid from the interior of the turbine the exterior of the turbine (i.e. the atmosphere). It will be appreciated that the first and second streams of fluid may originate from the same or separate fluid sources.

The actuation member and the bore may define a clearance therebetween which is substantially free of mechanical sealing elements. It will be appreciated that the term "mechanical sealing elements" is intended to mean solid components which act to exclude the passage of fluid through the clearance. As noted above, such mechanical sealing elements may include o-rings, piston rings and the like.

The pressure of the second gas (i.e. the fluid delivered to the bore via the fluid conduit) may be greater than or equal to an operating pressure of the interior of the turbine, as defined by the first gas. It will be understood that an operating pressure of the turbine is a pressure of the fluid within a specific portion of the turbine during use. For example, the operating pressure of the turbine may be the pressure of the fluid in the interior of the turbine upstream of the turbine wheel, such as the pressure within an inlet of the turbine, or downstream of the turbine wheel, such as pressure within an outlet of the turbine. In particular, the pressure of the fluid delivered to the bore via the fluid conduit may be determined based upon the operating pressure within a portion of the interior of the turbine which is in fluid flow communication with the bore. For example, where the bore is in fluid flow communication with the turbine inlet, the pressure of the fluid delivered to the bore via the fluid conduit may be greater than or equal to the pressure of the fluid within turbine inlet. Likewise, where the bore is in fluid flow communication with the turbine outlet, the pressure of the fluid delivered to the bore via the fluid conduit may be greater than or equal to the pressure of the fluid within turbine outlet.

It will be appreciated that by pressurising the fluid delivered to the bore via the fluid conduit so that it is greater than or equal to the operating pressure of the turbine, the pressure within the turbine will never be larger than the pressure within the bore. As such, the fluid within the turbine will not possess enough potential energy to drive fluid through the bore. Leakage of fluid from within the turbine interior to an exterior of the turbine is therefore avoided.

The bore may be in fluid flow communication with the first gas at a position downstream of the turbine wheel. That is to say, the bore may be in fluid flow communication with a portion of the interior of the turbine downstream of the turbine wheel. For example, the bore may be formed within a portion of the turbine housing downstream of the turbine wheel. As such, the bore may be in fluid flow communication with an outlet of the turbine. Alternatively, the bore may be in fluid flow communication with a portion of the turbine upstream of the turbine wheel, such that the bore is in fluid flow communication with the inlet of the turbine.

The bore may extend between the interior of the turbine housing and the exterior of the turbine housing. The actuation member may extend between an interior of the turbine housing and the exterior of the turbine housing.

The fluid conduit may be at least partially defined by the turbine housing. For example, the fluid conduit may be a through hole extending from the bore to an exterior of the turbine. The fluid conduit may be defined by the turbine housing alone, or may be partially defined by the turbine housing in combination with a further component of the turbine that is not integral with the turbine housing, such as for example a bush or the like.

The wastegate arrangement may further comprise a bush at least partially defining the fluid conduit. That is to say, the fluid conduit may be at least partially defined by the bush and at least partially defined by the turbine housing. For example, the fluid conduit may be defined by a first through hole formed in the bush and a second through hole formed in the turbine housing. The first and second through holes may be aligned in registration with one another such that the fluid conduit extends through both the turbine housing and the bush.

The bush may comprise a circumferentially extending groove. For example, the circumferentially extending groove may be aligned with the fluid conduit. It will be appreciated that the circumferentially extending groove may be configured to permit fluid flow communication between different portions of the fluid conduit, such as, for example, between the first through hole and the second through hole. The circumferentially extending groove therefore permits some rotational misalignment between the first and second through holes.

The bore may be at least partially defined by the turbine housing. For example, the bore may be a through hole formed in a side of the turbine housing. The bore may be defined by the turbine housing alone, or may be partially defined by the turbine housing in combination with a further component of the turbine that is not integral with the turbine housing, such as for example a bush or the like.

The actuation member may be a rotatable shaft. It will be appreciated that when the shaft is rotated the valve member is rotated about the shaft. The actuation member and the valve member may be pivotable about a longitudinal axis of the bore. The turbine may further comprise an actuation means configured to urge the valve member between the open and closed states. For example, the actuation means may be connected to the actuation member and may be configured to cause pivoting of the valve member about the shaft between the open and closed states. In the closed state the actuation means may cause the valve member to urge against the wastegate seat so as to substantially prevent venting of fluid through the wastegate passage. The actuation means may be for example a pneumatic or electrical actuator, or the like.

The fluid conduit may be configured to receive fluid which has been compressed by a compressor. It will be appreciated that the compressor may be external to the turbine. For example, the compressor may be a component part of a leak testing system for the turbine and the fluid conduit may be connected to the compressor.

The turbine may be configured to form part of a turbocharger. In such embodiments, the fluid conduit may be configured to receive fluid which has been compressed by a compressor of the turbocharger. That is to say, the fluid conduit may be configured to deliver air pressurised by the compressor of the turbocharger to the bore, and the turbine may receive exhaust gas from an internal combustion engine. It will be appreciated that, under normal turbocharger operating conditions, the pressure of the fluid compressed by the compressor is higher than the pressure of the exhaust gas within either the inlet or the outlet of the turbine. As such, a pressure differential will exist between the bore and the turbine outlet that will prevent exhaust gas leakage from the turbine via the bore.

According to a second aspect of the disclosure there is provided a method of testing for leaks within a turbine according to the first aspect of the disclosure, wherein the method comprises forming a fluidic seal by energising the second gas and delivering the second gas to the fluid conduit. As set out above with regard to the first aspect of the disclosure, it will be appreciated that energising the second gas means to provide the second gas with an energy density which is higher than that of its surroundings and/or the first gas. With further reference to the first aspect of the disclosure, it will be appreciated that the advantage of forming a fluidic seal is that it prevents otherwise acceptable turbines from failing the pass-off test without the requirement for any physical (i.e. solid) barriers.

The pressure of the second gas may be greater than or equal to the pressure of the first gas.

The second gas may originate from a gas source, and the gas source may simultaneously also deliver the first gas to the turbine, and preferably to an interior of the turbine. Because the fluid delivered to the conduit and the fluid within the interior of the turbine originate from the same source, it will be appreciated that the energy density of the fluid in the interior of the turbine and the energy density of the fluid delivered to the fluid conduit may be substantially equal. As such, the energy density of the fluid within the interior of the turbine is not sufficient to overcome the fluidic seal. In embodiments which utilise liquid rather than gas, the gas source may be a liquid source, or more generally a fluid source.

The gas source may be a compressor. As such, the gas source may deliver pressurised air to the fluid conduit so as to form the fluidic seal.

The method may comprise measuring a flowrate of the first gas using a flowmeter positioned upstream of the turbine. It will be appreciated that if any leakage paths from the interior of the turbine to the exterior of the turbine are present this will be observed as an increased flow rate in comparison to an adequately sealed turbine. However, the flow rate of the fluid delivered to the fluid conduit and which forms the fluidic seal is not measured, and therefore will not affect the result of the leakage portion of the pass-off test (other than in the provision of a fluidic seal).

The method may comprise sealing an outlet of the turbine.

According to a third aspect of the disclosure, there is provided a method of preventing leakage from a turbine according to the first aspect of the disclosure, wherein the method comprises forming a fluidic seal by energising the second gas and delivering the second gas to the fluid conduit. As set out above with regard to the first aspect of the disclosure, it will be appreciated that energising the second gas means to provide the second gas with an energy density which is higher than that of its surroundings. With further reference to the first aspect of the disclosure, it will be appreciated that the advantage of forming a fluidic seal is that where the turbine is used with an internal combustion engine, the fluidic seal prevents exhaust gasses from the internal combustion engine leaking to atmosphere without passing through an aftertreatment system and without the requirement for any physical (i.e. solid) barriers which may degrade over time.

The pressure of the second gas may match or exceed the pressure of the first gas. As such, the fluid within the interior of the turbine housing will not have enough potential energy to overcome the fluidic seal.

The turbine may form part of a turbocharger, and the second gas may be compressed by a compressor of the turbocharger.

BRIEF DESCRIPTION OF THE FIGURES

A specific embodiment of the present disclosure will now be described, by way of example only, with reference to the accompanying drawings, in which.

DETAILED DESCRIPTION OF EMBODIMENTS OF THE DISCLOSURE

Figure 1:
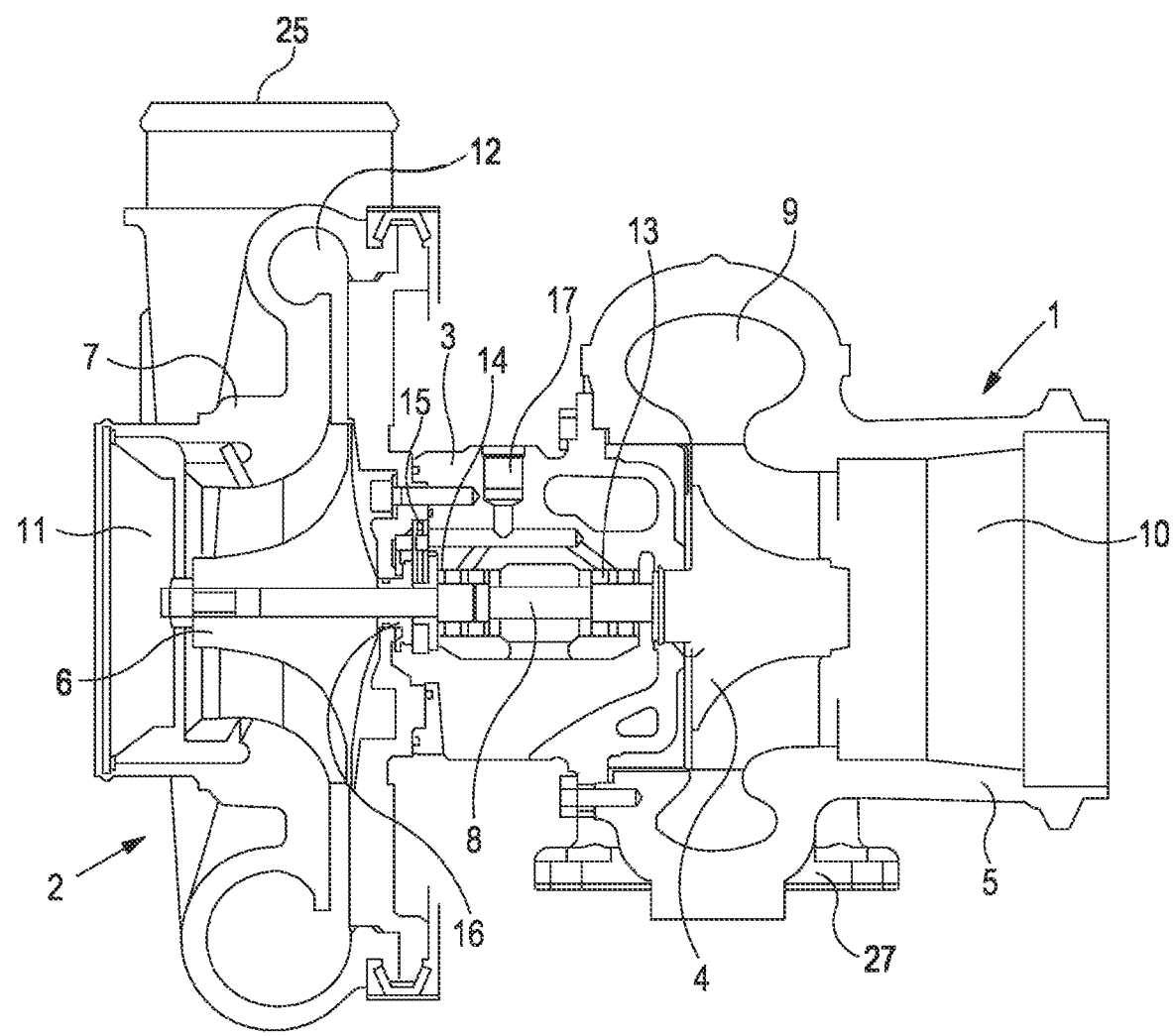
FIG. 1 shows a schematic cross-section through a portion of a known turbocharger.
Figure 2:
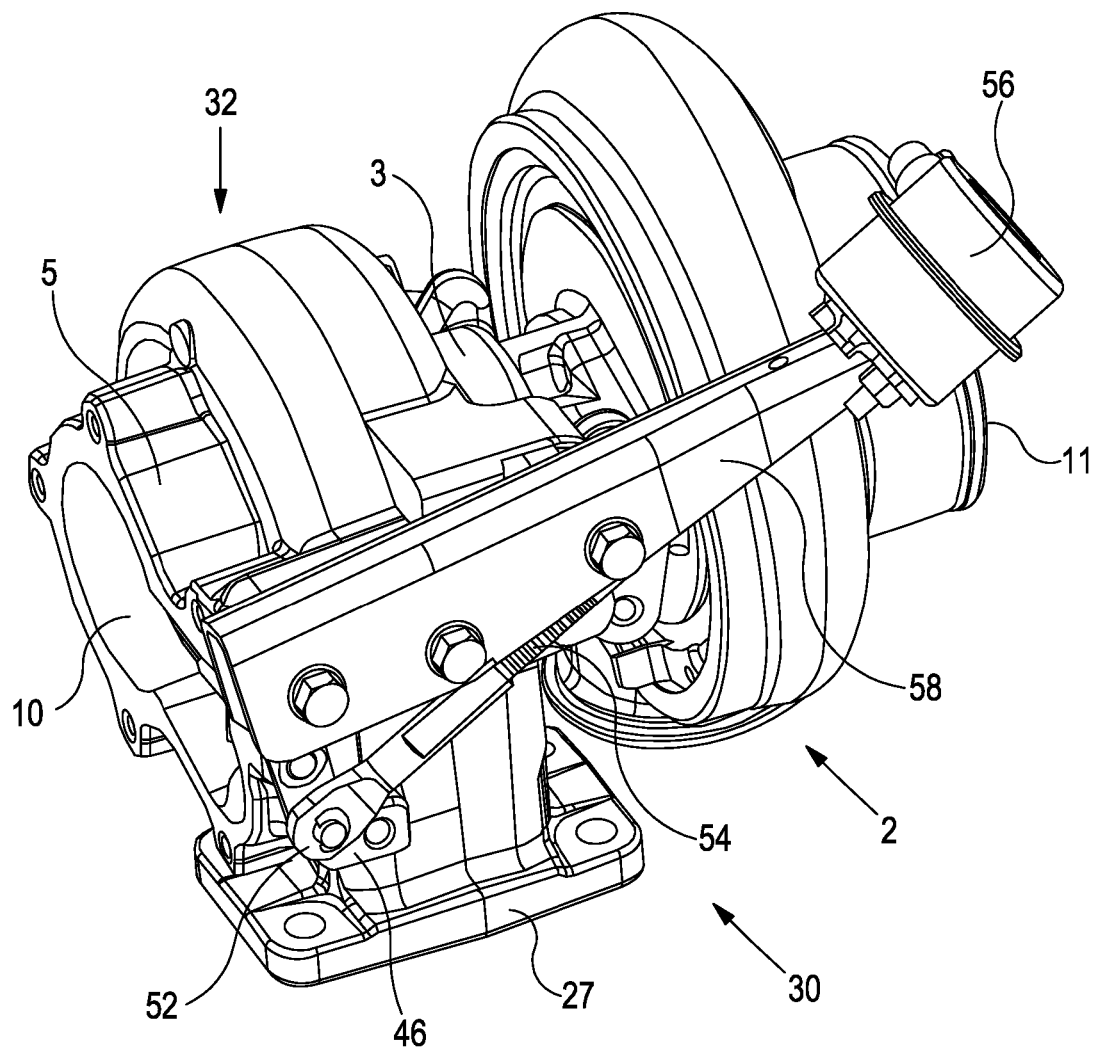
FIG. 2 shows a schematic perspective view of a portion of a turbocharger comprising a turbine in accordance with the present disclosure.

FIG. 1 shows a schematic cross-section through a known turbocharger. The turbocharger comprises a turbine 1 joined to a compressor 2 via a central bearing housing 3. The turbine 1 comprises a turbine wheel 4 for rotation within a turbine housing 5. Similarly, the compressor 2 comprises a compressor wheel 6 which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3.

The turbine housing 5 has an exhaust gas inlet volute 9 located annularly around the turbine wheel 4 and an exhaust gas outlet 10. The compressor housing 7 has an axial air intake passage 11 and a volute 12 arranged annularly around the compressor chamber. The volute 12 is in gas flow communication with a compressor outlet 25. The turbocharger shaft 8 rotates on journal bearings 13 and 14 housed towards the turbine end and compressor end respectively of the bearing housing 3. The compressor end bearing 14 further includes a thrust bearing 15 which interacts with an oil seal assembly including an oil slinger 16. Oil is supplied to the bearing housing from the oil system of the internal combustion engine via oil inlet 17 and is fed to the bearing assemblies by oil passageways 18. The oil fed to the bearing assemblies may be used to both lubricate the bearing assemblies and to remove heat from the bearing assemblies.

In use, the turbine wheel 4 is rotated by the passage of exhaust gas from the exhaust gas inlet 9 to the outlet 10. Exhaust gas is provided to exhaust gas inlet 9 from an exhaust manifold (also referred to as an outlet manifold) of the engine (not shown) to which the turbocharger is attached. The turbine wheel 4 in turn rotates the compressor wheel 6 which thereby draws intake air through the compressor inlet 11 and delivers boost air to an inlet manifold of the engine via the volute 12 and then the outlet 25.

The exhaust gas inlet 9 is defined by a portion of the turbine housing 5 which includes a turbocharger mounting flange 27 at the end of the exhaust gas inlet 9 remote from the turbine wheel 4.

FIGS. 2 to 5 show various schematic views of portions of a turbocharger 30 which includes a turbine 32 in accordance with an embodiment of the present disclosure. The turbocharger 30 includes all of the features of the turbocharger described above in relation to FIG. 1. The same numbering is used within FIGS. 2 to 5 for features of the turbocharger 30 shown in FIGS. 2 to 5 which are equivalent to features shown in the turbocharger of FIG. 1.

In addition to the features of the turbine shown in FIG. 1, the turbine according to an embodiment of the present disclosure shown in FIGS. 2 to 5 also includes a wastegate arrangement 33. As can be seen best in FIG. 4, the turbine 32 includes a turbine housing 5 which defines a turbine inlet 9 upstream of the turbine wheel 4, and a turbine outlet 10 downstream of the turbine wheel 4. The wastegate arrangement 33 includes a wastegate passage 34 (indicated schematically in dashed lines) which extends between the turbine inlet 9 and turbine outlet 10, and hence connects the turbine inlet 9 with the turbine outlet 10. The wastegate arrangement 33 also includes a wastegate valve comprising a movable valve member 36 and a valve seat 38. In the present embodiment the valve member 36 is a flap type valve member. The valve seat 38 is a surface of the turbine housing 5 which is configured to be contactable with a surface of the valve member 36 in order to produce a substantially fluid-tight seal between the valve seat 38 and the valve member 36.

Figure 3:
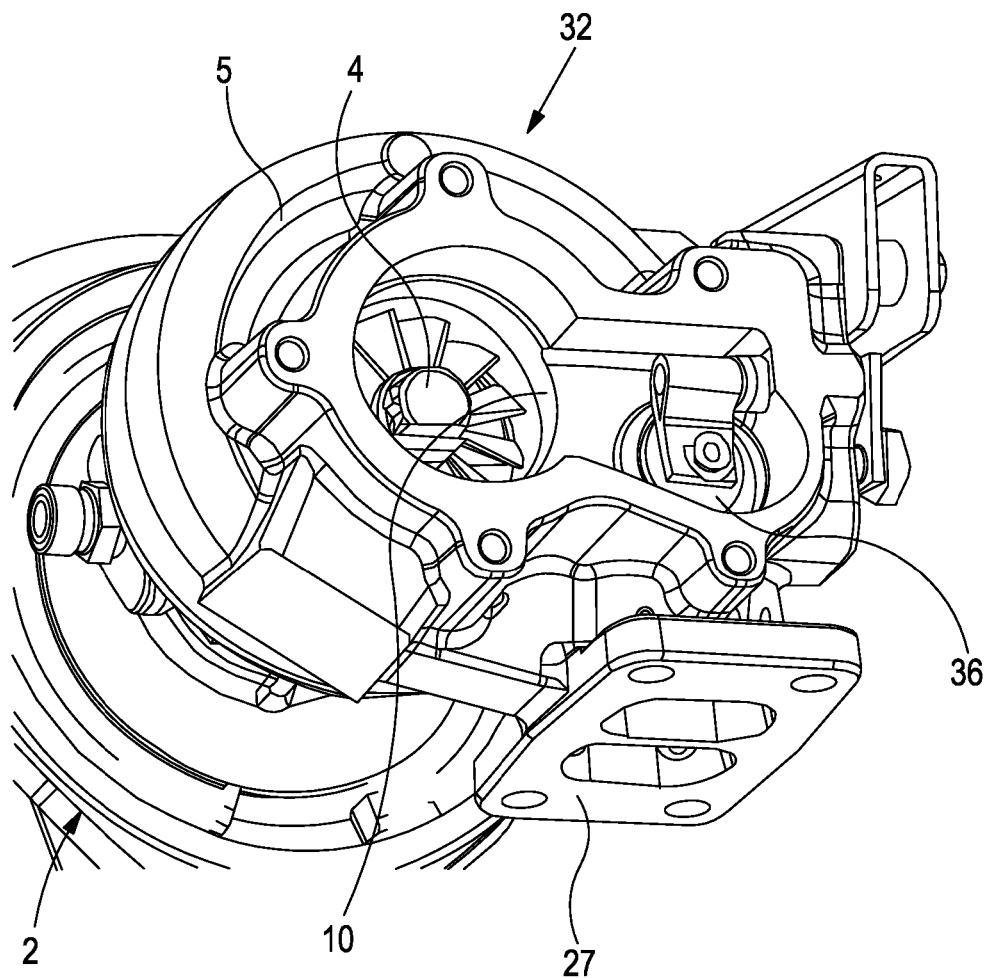
FIG. 3 shows an end-on schematic perspective view of a portion of the turbine of FIG. 2.
Figure 4:
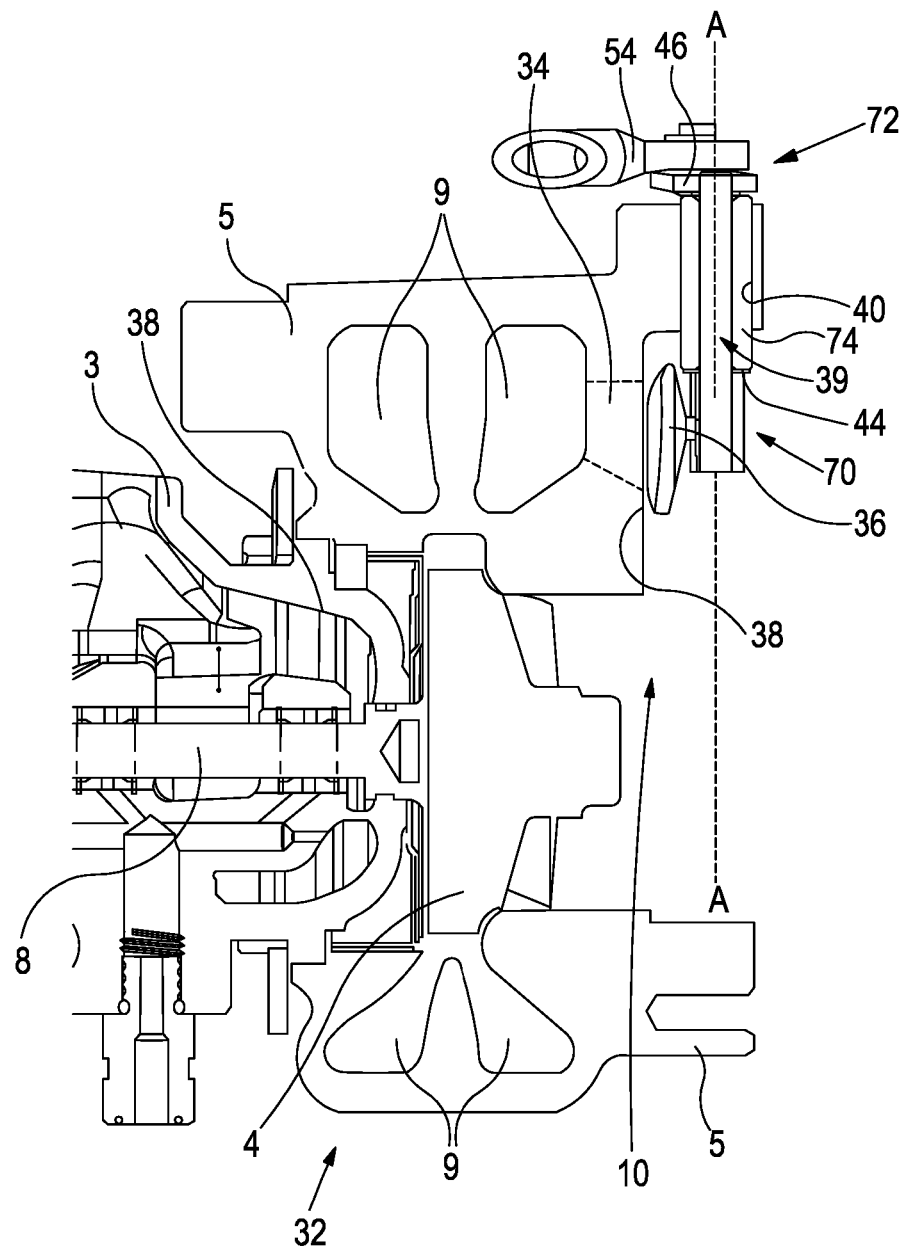
FIG. 4 shows a schematic cross-section through the turbine of FIGS. 2 and 3.

The wastegate valve (and hence valve member 36) has an open state (as can be seen in FIG. 4) in which fluid may pass between the turbine inlet 9 and turbine outlet 10 via the wastegate passage 34 rather than through the turbine wheel 4. Such fluid is typically exhaust gas from an internal combustion engine. The wastegate valve (and hence valve member 36) also has a closed state (as shown in FIG. 3) in which the wastegate valve member 36 contacts the valve seat 38 in order to substantially prevent gas from passing between the turbine inlet 9 and turbine outlet 10 via the wastegate passage 34.

The valve member 36 is mounted to an actuation member 39 having a longitudinal axis A. The actuation member 39 passes through a bore 40 of the turbine housing 5, and is movable so as to move the wastegate valve between the open and closed states. The actuation member 39 may be moved in any appropriate manner so as to move the valve member 36 of the wastegate valve between the open and closed states. For example, the actuation member 39 shown in FIGS. 2 to 5 includes a generally cylindrical shaft 45 which extends along the longitudinal axis A. The shaft 45 of the actuation member 39 is connected at a first end to the valve member 36. The shaft 45 of the actuation member 39 is connected at a second end to a lever arm 46. Spaced from the second end of the shaft 45 along the lever arm 46 is a stub 50. The stub 50 is received by a first end 52 of an actuation rod 54. A second end of the actuation rod 54 is connected to an actuator 56.

In this embodiment, the actuator 56 is a pneumatic actuator; however, any appropriate actuator may be used. The mounting and operation of an actuator (and any associated linkage) in order to move a valve member of a wastegate valve is well-known, and hence further discussion of this is omitted within this description. However, it is worth noting that movement of the actuator rod 54 causes the lever arm 46, and hence attached shaft 45 of the actuation member 39, to pivot about axis A. The pivoting movement of the shaft 45 of the actuation member 39 about the axis A results in the valve member 36 also pivoting about axis A. Hence the valve member 36 can pivot about axis A between the open state (corresponding to the open state of the wastegate valve) in which the valve member 36 is spaced from the valve seat 38, and the closed state (corresponding to the closed state of the wastegate valve) in which the valve member 36 contacts the valve seat 38.

Figure 5:
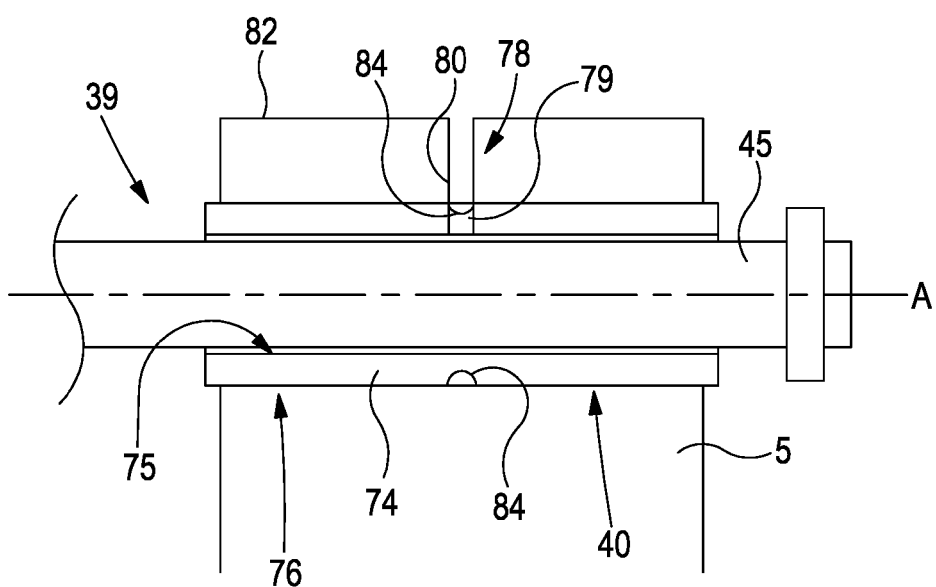
FIG. 5 shows an enlarged schematic view of a wastegate arrangement of the turbine of FIGS. 2 to 4.

With reference to FIGS. 4 and 5, the wastegate arrangement 33 further comprises a bush 74 that is received by the bore 40 of the turbine housing 5. The bush 74 is generally annular and comprises an inner surface 75 defining a central opening through which the shaft 45 of the actuation member 39 is received. The shaft extends from an interior 77 of the turbine 1 and an exterior 81 of the turbine 1.

An annular clearance 83 exists between the inner surface 75 of the bush 74 and the shaft 45 of the actuation member 39. The annular clearance 83 is a region of empty space configured to permit rotational movement of the shaft 45 relative to the bush 74 and the turbine housing 5. The annular clearance 83 is relatively narrow in comparison with the diameter of the shaft 45 and the opening of the bush 74, and is typically just large enough to permit unhindered rotation of the shaft 45 within the central opening of the bush 74, without being so large as to cause rattling of the shaft 45 within the central opening of the bush 74. The bush 74 further comprises an outer surface 76 which is configured to fit within the bore 40 of the turbine housing 5, and is held to the turbine housing 5 by an interference fit such that the bush 74 is secured both axially and rotationally relative to the turbine housing 5.

The wastegate arrangement 33 further comprises a fluid conduit 78 that extends from the annular clearance 83 to the exterior 81 of the turbine housing 5. In the present embodiment, the fluid conduit 78 is partially defined by both the bush 74 and the turbine housing 5. In particular, the fluid conduit 78 is partially defined by a first through hole 79 of the bush 74 and partially defined by a second through hole 80 of the turbine housing 5. The first through hole 79 of the bush 74 extends from the inner surface 75 to the outer surface 76 of the bush 74, and is concentrically aligned with the second through hole 80 of the turbine housing 5. The second through hole 80 of the turbine housing 5 extends from the bore 40 to an outer surface 82 of the turbine housing 5. In some embodiments, in order to account for any rotational misalignment between the first through hole 79 and the second through hole 80, the bush 74 further comprises a circumferentially extending groove 84 configured to allow the passage of fluid between the first through hole 79 and the second through hole 80. In some embodiments, the bush 74 may comprise a plurality of first through holes 79 circumferentially distributed around the groove 84.

The second through hole 80 is connected to an external source of pressurised fluid. It will be appreciated that in some embodiments of the present disclosure the pressurised fluid is air, however in other embodiments the pressurised fluid may be any other suitable fluid medium. Although not shown in the figures, in some embodiments, the outer surface 82 of the turbine housing 5 is a mounting surface configured to couple with a corresponding mounting surface of an exhaust gas aftertreatment system positioned downstream of the turbine 32. In such embodiments, the second through hole 80 of the fluid conduit 78 may be aligned with a further conduit defined by the exhaust gas aftertreatment system which is connected to the source of pressurised fluid. In other embodiments the second through 80 hole may comprise a connection portion configured to connect to external tubing (not shown) configured to deliver pressurised air to the second through hole 80.

During use, pressurised fluid is channeled from a pressure source into the annular clearance 83 between the shaft 45 and the bush 74 via the fluid conduit 80 so as to form a fluidic seal. The pressurised fluid is compressed such that its pressure is equal to or greater than an operating pressure of the exhaust gasses passing through the turbine outlet 10 of the turbine 32. Because the pressurised fluid is equal to or at a higher pressure than the operating pressure of the turbine outlet 10 of the turbine 32, the fluid within the turbine outlet 10 does not have enough potential energy to flow into the annular clearance 83 between the shaft 45 and the bush 74. That is to say, higher pressure fluid within the annular clearance 83 forms a fluid barrier (or fluidic seal) which prevents lower pressure fluid in the turbine outlet 10 from entering the annular clearance 83. As such, exhaust gasses are prevented from passing through the annular clearance 83 and into the environment external to the turbine housing 5.

A fluidic seal is a seal which does not comprise any mechanical sealing elements. For instance, the clearance 84 between the shaft 45 and the bush 74 does not comprise any mechanical (i.e. solid) barriers to prevent fluid from travelling between the interior 77 and the exterior 81 of the turbine housing 5. The fluidic seal works by injecting fluid at high pressure into the clearance 84 which forms a fluid barrier preventing lower pressure fluid from passing across the barrier. It will be appreciated that the pressure source may be any suitable pressure source, such as, for example a compressor or a pump. Because the shaft 45 extends between the interior 77 and the exterior 81 of the turbine housing 5, during use some of the fluid forming the fluidic seal may escape to the atmosphere via the clearance 84. However, it will be appreciated that typically the pressure source is able to supply an adequate amount of pressurised fluid to the fluid conduit such that any fluid which escapes to atmosphere is replaced instantaneously. The fluidic seal preventing transfer of fluid from the interior 77 and the exterior 81 of the turbine housing 5 is therefore maintained despite any leakage of the fluid forming the fluidic seal to atmosphere.

It will be appreciated that in alternative embodiments, other properties of the fluid aside from its pressure may be used to form the fluidic seal. For example, high velocity fluid many be delivered to the fluid conduit 80. It will be appreciated that where the high velocity fluid has an internal energy (i.e. a "velocity head") which is greater than or equal to the internal energy of the fluid within the interior 77 of the turbine housing 5, this will prevent fluid leakage.

Figure 6:
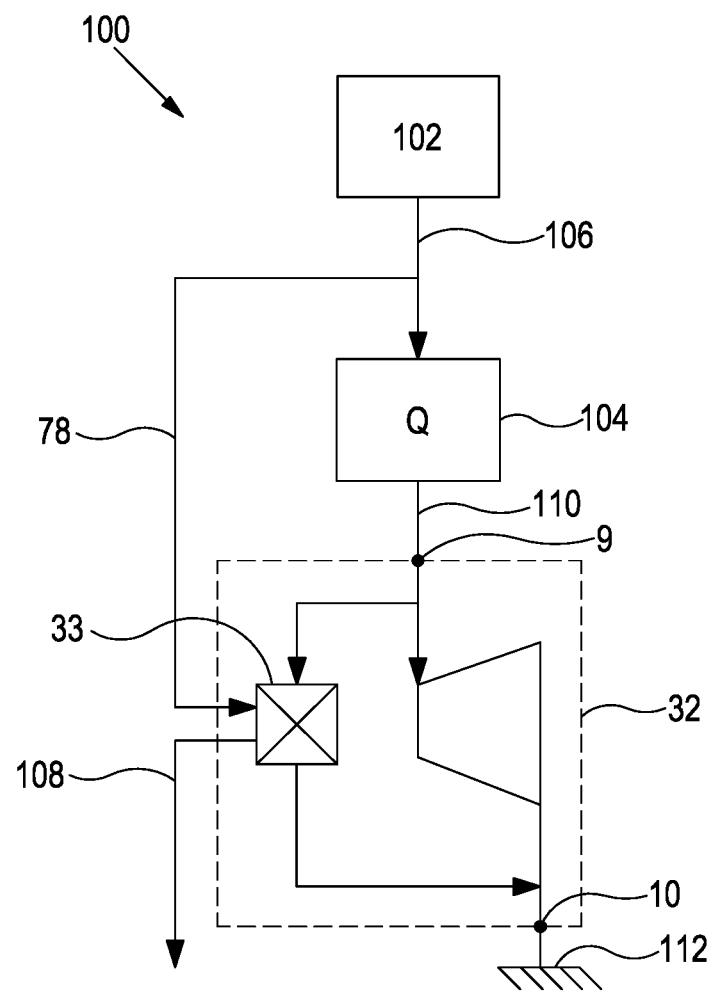
FIG. 6 shows a schematic block diagram of a turbine leakage testing system in accordance with the present disclosure.

FIG. 6 shows a schematic view of a turbine leakage testing system 100 for performing the leakage portion of a turbine (or turbocharger) pass-off test. Typically such a pass-off test will be conducted during manufacture of a turbine before the turbine is placed in service for the first time. The same numbering is used within FIG. 6 and the accompanying description for features of the leakage testing system 100 which are equivalent to features of the turbocharger 30 shown in FIGS. 2 to 5.

The leakage testing system 100 comprises a pressurised air source 102, a flowmeter 104, and a turbine 32 having a wastegate arrangement 33 in accordance with the present disclosure. The source 102 may be for example a compressed air tank, a pump or the like. A first air pathway 106 extends from the source 102 to the flowmeter 104 so as to deliver pressurised fluid to the flowmeter 104. The fluid conduit 78 of the turbine 32 is connected to the first air pathway 106 at a point upstream of the flowmeter 104. A second fluid pathway 110 extends from the flowmeter 104 to the turbine inlet 9 so as to deliver pressurised fluid to the turbine 32. The turbine outlet 10 is substantially sealed by a blockage 112, so as to cause the interior of the turbine 32 to fill with pressurised fluid.

The leakage testing system 100 is configured to test for leaks which may detrimentally affect the performance of the turbine 32. The turbine 32 is tested by pumping fluid into the turbine 32 whilst the outlet 10 of the turbine 32 is sealed or blocked by the blockage 112. The flow rate of the pumped fluid is measured using the flow meter 104. If no leak is present within the turbine 32, a substantially zero flowrate will be observed by the flow meter 104. However, if a leak is present a non-zero flow rate will be observed by the flow meter 104. A small amount of leakage may be allowable if it is not greater than a predetermined value, such value being determined based upon the properties of the turbine being tested such as for example size, shape, operating conditions or the like. As such, the flowrate measured by the flowmeter 104 may be compared with the predetermined value so as to determine whether or not the turbine 32 is functioning to an acceptable level. Turbines which do not meet the required standard are rejected and are not shipped to the customer.

In alternative embodiments, pass-off test may be performed on an internal combustion engine comprising a turbine 32 (rather than on the turbine 32 in isolation). It will be appreciated that in such embodiments the turbine leakage testing system 100 may be part of an engine leakage testing system.

As shown by arrow 108 in FIG. 6, some of the fluid delivered to the wastegate arrangement 33 via the fluid conduit 78 may escape to atmosphere without passing through the turbine outlet 10 (e.g. through the clearance 83 between the bush 74 and the shaft 45). However, because the fluid conduit 78 is connected to the first air pathway 106 upstream of the flowmeter 104, the flowrate of the fluid passing through the fluid conduit 78 is not measured by the flowmeter 104 and therefore does not negatively affect the result of the pass-off test.

Figure 7:
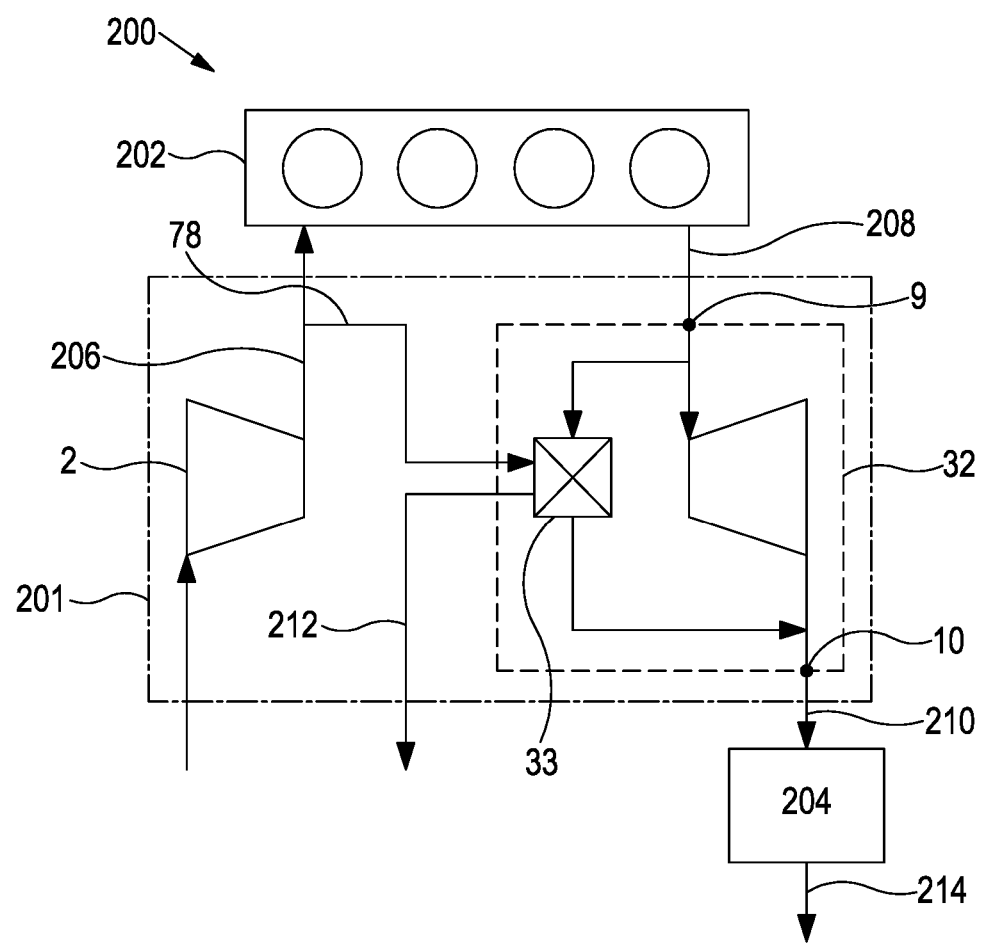
FIG. 7 shows a schematic block diagram of a vehicle engine system in accordance with the present disclosure.

FIG. 7 shows a schematic view of a vehicle engine system 200. The same numbering is used within FIG. 7 and the accompanying description for features of the vehicle engine system 200 which are equivalent to features turbocharger 30 shown in FIGS. 2 to 5.

The vehicle engine system 200 comprises an engine 202 having a turbocharger system 201 and an exhaust gas aftertreatment system 204. The turbocharger system 201 comprises a compressor 2 and a turbine 32 connected via a common shaft (not shown). The turbine 32 further comprises a wastegate arrangement 33. A compressor outlet passage 206 extends from the compressor 2 to an intake of the engine 202 so as to deliver compressed air to the engine 202. An engine outlet passage 208 extends from the engine 202 to the inlet 9 of the turbine 32 so as to deliver exhaust gasses to the turbine 32. Turbine outlet ducting 210 extends between the turbine outlet 10 and the aftertreatment system 204 so as to deliver exhaust gasses to the aftertreatment system 204. The fluid conduit 78 is connected to the compressor outlet passage 206 at a point upstream of the engine 202 such that intake air compressed by the compressor 2 is delivered to the wastegate arrangement 33.

During use, intake air is compressed by the compressor 2 and is channeled to the engine 202 via the compressor outlet passage 206. The compressed intake air is used for combustion within the engine 202 with the addition of a fuel.

Once combustion is complete, the combusted fuel and exhaust gasses are expelled from the engine 202 and channeled to the turbine 32 via the engine outlet passage 208. The exhaust gas may pass through a turbine wheel of the turbine 32 (such as the turbine wheel 4 of FIGS. 3 and 4) or may bypass the turbine wheel via the wastegate arrangement 33. Because the wastegate arrangement 33 is connected to the compressor 2 via the fluid conduit 78, a portion of the compressed air is diverted away from the engine 202 and into the wastegate arrangement 33. That is to say, the compressor 2 acts as a pressure source to supply pressurised fluid to the wastegate arrangement 33. It will be appreciated that under normal turbocharger operating conditions, the diverted air from the compressor outlet passage 206 is at a higher pressure than the exhaust gas in the turbine 32. As such, the pressurised fluid supplied to the wastegate arrangement 33 by the fluid conduit 78 may be used to prevent exhaust gas escaping via the clearance 83 between the shaft 45 and the bush 74 of the wastegate arrangement 33 as shown in FIG. 5. That is to say, the pressurised fluid may be used to form a fluidic seal (i.e. a fluid barrier) within the wastegate arrangement 33 in the manner described above with reference to FIGS. 2 to 5.

The exhaust gasses exiting the turbine 32 via the turbine outlet 10 are channeled to the aftertreatment system 204 which removes harmful substances such as particulate matter and NOx. After passing through the aftertreatment system 204, the exhaust gasses are vented to the environment, as indicated by line 214.

It will be appreciated that during use, a portion of the pressurised fluid may leak out of the wastegate arrangement 33 (i.e. via the clearance 83 between the shaft 45 and the bush 84 as shown in FIG. 5), as shown by arrow 212. However, the pressurised fluid is substantially free from exhaust gasses and therefore any leakage of the pressurised fluid from the wastegate arrangement 33 to atmosphere or into the turbine outlet 10 and the aftertreatment system 104 will be harmless. That is to say, by using pressurised fluid which does not contain exhaust gasses to provide the fluidic seal (i.e. fluid barrier) of the wastegate arrangement 33, leakage of the pressurised fluid from the wastegate arrangement 33 does not contribute to the emissions produced by the vehicle engine system 200. In embodiments where the vehicle engine system further comprises an exhaust gas recirculation system, it is preferable that the fluid conduit 78 is connected to the compressor outlet passage 206 at a point downstream of the compressor 2 and upstream of both the engine 202 and any throttle valve associated with the exhaust gas recirculation system. As such, this arrangement ensures that only "clean" air is able to enter the fluid conduit 78, and avoids ingress of recirculated exhaust gasses into the fluid conduit 78 to ensure that all exhaust gasses are properly channeled through the aftertreatment system 204.

It will be appreciated that although the embodiment of the present disclosure described above is a turbine of a turbocharger, in other embodiments of the present disclosure the turbine may be any turbine comprising a wastegate. For example, the turbine may be a steam turbine or a gas turbine. Furthermore, although the embodiment of the present disclosure described above is a radial turbine, it will be appreciated that a turbine according to the present disclosure may be an axial turbine.

What is claimed:

1. A turbine comprising:
    a turbine housing defining a turbine inlet upstream of a turbine wheel and a turbine outlet downstream of the turbine wheel;
    a wastegate passage connecting the turbine inlet and the turbine outlet;
    a wastegate valve comprising a movable valve member;
    the wastegate valve having an open state in which a first gas may pass between the turbine inlet and turbine outlet via the wastegate passage and a closed state in which the valve member prevents said first gas from passing between the turbine inlet and the turbine outlet via the wastegate passage;
        wherein the valve member is mounted to an actuation member, the actuation member passing through a bore of the turbine housing and being movable so as to move the wastegate valve between the open and closed states;
        wherein the turbine comprises a fluid conduit configured to deliver a second gas to the bore so as to form a fluidic seal between the bore and the actuation member so as to prevent the passage of said first gas along the bore; and
        wherein the actuation member and the bore define a clearance therebetween, the clearance being free of mechanical sealing elements.

2. A turbine according to claim 1, wherein the bore is in fluid flow communication with the first gas at a position downstream of the turbine wheel.

3. A turbine according to claim 1, wherein the fluid conduit is at least partially defined by the turbine housing.

4. A turbine according to claim 1, wherein the turbine housing comprises a bush at least partially defining the bore.

5. A turbine according to claim 4, wherein the bush comprises a circumferentially extending groove.

6. A turbine according to claim 1, wherein the bore is at least partially defined by the turbine housing.

7. A turbine according to claim 1, wherein the actuation member is a rotatable shaft.

8. A turbine according to claim 1, wherein the turbine further comprises an actuation means configured to urge the wastegate valve between the open and closed states.

9. A turbine according to claim 1, wherein the fluid conduit is configured to receive fluid which has been compressed by a compressor.

10. A turbine according to claim 1, wherein the turbine is configured to form part of a turbocharger.

11. A method of testing for leaks within a turbine according to claim 1, wherein the method comprises forming a fluidic seal within the clearance free of mechanical sealing elements by energising the second gas and delivering the second gas to the fluid conduit.

12. The method of claim 11 wherein the pressure of the second gas is greater than or equal to the pressure of the first gas.

13. The method of claim 11, wherein the second gas originates from a gas source, and wherein the gas source simultaneously also delivers the first gas to the turbine.

14. The method of claim 13, wherein the gas source is a compressor.

15. The method of claim 11, wherein method further comprises measuring a flowrate of the first gas using a flowmeter positioned upstream of the turbine.

16. The method of claim 11, wherein the method further comprises sealing an outlet of the turbine.

17. A method of preventing leakage from a turbine according to claim 1, wherein the method comprises forming a fluidic seal within the clearance free of mechanical sealing elements by energising the second gas and delivering the second gas to the fluid conduit.

18. The method of claim 17, wherein the pressure of the second gas matches or exceeds the pressure of the first gas.

19. The method of claim 18, wherein the turbine forms part of a turbocharger, and wherein the second gas is compressed by a compressor of the turbocharger.

\* \* \* \* \*